US012602638B2

(12) United States Patent
Kiyoki et al.

(10) Patent No.: US 12,602,638 B2

(45) Date of Patent: Apr. 14, 2026

(54) RISK MANAGEMENT SYSTEM AND RISK MANAGEMENT METHOD

(71) Applicants: MITANI SANGYO CO., LTD., Kanazawa (JP); Yasushi Kiyoki, Tsukuba (JP)

(72) Inventors: Yasushi Kiyoki, Tsukuba (JP); Yukio Chen, Tsuchiura (JP); Koichi Mori, Kanazawa (JP); Toshiaki Fukabori, Kanazawa (JP); Tomokazu Shigeri, Kanazawa (JP); Yoshikane Oda, Kanazawa (JP)

(73) Assignees: MITANI SANGYO CO., LTD., Kanazawa (JP); Yasushi Kiyoki, Tsukuba (JP)

( * ) Notice: Subject to any disclaimer, the term of this patent is extended or adjusted under 35 U.S.C. 154(b) by 211 days.

(21) Appl. No.: 18/341,035

(22) Filed: Jun. 26, 2023

(65) Prior Publication Data

US 2023/0334404 A1 Oct. 19, 2023

Related U.S. Application Data

(63) Continuation of application No. PCT/JP2021/044295, filed on Dec. 2, 2021.

(30) Foreign Application Priority Data

Jan. 7, 2021 (JP) ................................. 2021-001756

(51) Int. Cl.
| | |
|---|---|
| *G06Q 10/00* | (2026.01) |
| *G06Q 10/04* | (2023.01) |
| *G06Q 10/0635* | (2023.01) |

(52) U.S. Cl.
CPC ......... *G06Q 10/0635* (2013.01); *G06Q 10/04* (2013.01)

(58) Field of Classification Search
None
See application file for complete search history.

(56) References Cited

U.S. PATENT DOCUMENTS

| | | | | |
|---|---|---|---|---|
| 7,020,701 | B1 * | 3/2006 | Gelvin | .................... H04L 67/12 |
| | | | | 709/224 |
| 9,367,810 | B1 * | 6/2016 | Gagne | ................. G06F 11/0793 |

(Continued)

FOREIGN PATENT DOCUMENTS

| | | |
|---|---|---|
| JP | 2002215804 A | 8/2002 |
| JP | 2009061221 A | 3/2009 |

(Continued)

OTHER PUBLICATIONS

M Safaei, AS Ismail, H Chizari, M Driss (Standalone noise and anomaly detection in wireless sensor networks: a novel time-series and adaptive Bayesian-network-based approach)—Software: Practice . . . , 2020—Wiley Online Library (Year: 2020).*

(Continued)

*Primary Examiner* — Hafiz A Kassim

(74) *Attorney, Agent, or Firm* — ROSSI, KIMMS & McDOWELL LLP

(57) ABSTRACT

A risk management system, which is a risk management system of upper layer system connected with a plurality of types of lower layer systems, includes an acquisition unit that acquires first sensing data acquired by a first lower layer system capable of acquiring first type data and second sensing data acquired by a second lower layer system capable of acquiring data of a different type from first sensing data; a normalization processing unit that generates integrated normalized data by performing arithmetic processing for generating first normalized data based on the first sensing data and generating second normalized data based on the second sensing data, and performing first arithmetic process for generating integrated normalized data by per- (Continued)

forming second arithmetic process for generating first normalized data and second normalized data as one piece of data; and a prediction processing unit that generates predicted risk data based on the integrated normalized data.

10 Claims, 21 Drawing Sheets

(56)                References Cited

U.S. PATENT DOCUMENTS

| | | | | |
|---|---|---|---|---|
| 10,685,310 | B1 * | 6/2020 | McCuiston | ........ G06Q 10/0637 |
| 11,470,106 | B1 * | 10/2022 | Lin | ..................... H04L 63/1433 |
| 11,836,216 | B1 * | 12/2023 | McIntyre | ................ G06N 3/045 |
| 2012/0137367 | A1 * | 5/2012 | Dupont | ................... G06F 21/00 |
| | | | | 726/25 |
| 2013/0298230 | A1 * | 11/2013 | Kumar | ................... G06F 21/52 |
| | | | | 726/22 |
| 2015/0317582 | A1 * | 11/2015 | Nath | ................ G06Q 10/06311 |
| | | | | 705/7.13 |
| 2016/0371489 | A1 * | 12/2016 | Puri | ...................... G06F 16/254 |
| 2017/0006135 | A1 * | 1/2017 | Siebel | ....................... G06F 8/24 |
| 2017/0070522 | A1 * | 3/2017 | Bailey | .................... G06F 21/32 |
| 2017/0097863 | A1 * | 4/2017 | Ishii | .................... G06F 11/0778 |
| 2017/0147775 | A1 * | 5/2017 | Ohnemus | .............. G16H 50/50 |
| 2018/0314977 | A1 * | 11/2018 | Jiang | ...................... G06Q 40/02 |
| 2021/0073915 | A1 * | 3/2021 | Crabtree | ............ G06Q 30/0611 |
| 2023/0209367 | A1 * | 6/2023 | Chang | ...................... G06N 5/01 |
| | | | | 455/423 |

FOREIGN PATENT DOCUMENTS

| | | | |
|---|---|---|---|
| JP | 2020060810 | A | 4/2020 |
| JP | 2020086497 | A | 6/2020 |
| JP | 2020198070 | A | 12/2020 |

OTHER PUBLICATIONS

FY Yavuz, D Ünal, E Gül (Deep learning for detection of routing attacks in the internet of things)—. . . Journal of Computational Intelligence Systems, 2018—Springer. (Year: 2018).*

International Search Report issued in International Appln. No. PCT/JP2021/044295 mailed Dec. 28, 2021. English translation provided.

Written Opinion issued in International Appln. No. PCT/JP2021/044295 mailed Dec. 28, 2021. English translation provided.

Office Action issued in Japanese Appln. No. 2021-001756 mailed Apr. 20, 2021. English machine translation provided.

Notice of Allowance issued in Japanese Appln. No. 2021-001756 mailed Jul. 6, 2021. English machine translation provided.

Notice of Allowance issued in Japanese Appln. No. 2021-127524 mailed Jan. 11, 2022. English machine translation provided.

* cited by examiner

| Predicted heat index(℃) | First normalized data |
|:---:|:---:|
| 28.8 | 0.92 |
| 2.1 | -0.86 |
| 1.0 | -0.93 |
| 26.8 | 0.79 |
| 22.8 | 0.52 |

|  | 520a | 520b |  |
| --- | --- | --- | --- |

| Accumulated work amount (hr) | Second normalized data |
| --- | --- |
| 70 | 0.00 |
| 80 | 1.00 |
| 79 | 0.90 |
| 80 | 1.00 |
| 79 | 0.90 |

| Accumulated stay time (hr) | Third normalized data |
|---|---|
| 128 | 0.80 |
| 121 | 0.10 |
| 120 | 0.00 |
| 121 | 0.10 |
| 122 | 0.20 |

| First normalized data | Second normalized data | Third normalized data |
|:---:|:---:|:---:|
| 0.92 | 0.00 | 0.80 |
| -0.86 | 1.00 | 0.10 |
| -0.93 | 0.90 | 0.00 |
| 0.79 | 1.00 | 0.10 |
| 0.52 | 0.90 | 0.20 |

| First normalized data | Second normalized data | Third normalized data | Teacher data |
|:---:|:---:|:---:|:---:|
| 0.92 | 0.00 | 0.80 | 90 |
| -0.86 | 1.00 | 0.10 | 60 |
| -0.93 | 0.90 | 0.00 | 75 |
| 0.79 | 1.00 | 0.10 | 80 |
| 0.52 | 0.90 | 0.20 | 55 |

```
                    ┌──────────────┐
                    │    Start     │
                    └──────┬───────┘
                           │
                           ▼
        ┌──────────────────────────────────┐
S100    │         First risk               │
        │      managemet process           │
        └──────────────────┬───────────────┘
                           │
                           ▼
        ┌──────────────────────────────────┐
S200    │         Second risk              │
        │      managemet process           │
        └──────────────────┬───────────────┘
                           │
                           ▼
        ┌──────────────────────────────────┐
S300    │         Third risk               │
        │      managemet process           │
        └──────────────────┬───────────────┘
                           │
                           ▼
                    ┌──────────────┐
                    │     End      │
                    └──────────────┘
```

| User ID | User | Location ID | Field name |
|---------|------|-------------|------------|
| U1 | User 1 | P1 | A field |
| U2 | User 2 | P2 | B field |
| U3 | User 3 | P3 | C field |
| U4 | User 4 | P4 | D field |
| U5 | User 5 | P5 | E field |

| Predicted heat index (℃) | First normalized data |
|---|---|
| 29.0 | 0.93 |

| Predicted accumulated work amount (hr) | Second normalized data |
|---|---|
| 75.00 | 0.50 |

| Predicted accumulated stay time (hr) | Third normalized data |
|---|---|
| 128.00 | 0.80 |

FIG. 15B

| First normalized data | Second normalized data | Third normalized data | Risk data |
|---|---|---|---|
| 0.93 | 0.50 | 0.80 | 90 |

| Predicted heat index data(℃) | Warning level | Normalized data |
|---|---|---|
| 0.0 | 0.00 | 0.00 |
| 1.0 | 0.00 | 0.00 |
| 5.0 | 0.00 | 0.00 |
| 10.0 | 0.00 | 0.00 |
| 15.0 | 0.00 | 0.00 |
| 20.0 | 0.00 | 0.00 |
| 24.0 | 0.00 | 0.00 |
| 25.0 | 0.10 | 0.02 |
| 26.0 | 0.20 | 0.04 |
| 27.0 | 0.30 | 0.06 |
| 28.0 | 0.40 | 0.08 |
| 29.0 | 0.50 | 0.10 |
| 30.0 | 0.75 | 0.15 |
| 31.0 | 1.00 | 0.20 |
| 32.0 | 1.30 | 0.26 |
| 33.0 | 1.60 | 0.32 |
| 34.0 | 2.00 | 0.40 |
| 35.0 | 2.50 | 0.50 |
| 36.0 | 3.10 | 0.62 |
| 37.0 | 3.70 | 0.74 |
| 38.0 | 4.30 | 0.86 |
| 39.0 | 5.00 | 1.00 |

710   720   730

S201C

S300D

RISK MANAGEMENT SYSTEM AND RISK MANAGEMENT METHOD

CROSS REFERENCE TO RELATED APPLICATIONS

This application is a Continuation of International Patent Application No. PCT/JP2021/044295, filed on Dec. 2, 2021, which claims the benefit of priority to Japanese Patent Application No. 2021-001756, filed on Jan. 7, 2021, the entire contents of which are incorporated herein by reference.

FIELD

The present disclosure relates to a risk management system and a risk management method.

BACKGROUND

In recent years, the importance of labor management of employees has been increasing in the activities of corporations. In particular, in order for employees to work safely and comfortably, it is necessary to manage risks that may hinder the health of employees, such as working conditions and overtime hours. Japanese Laid Open Patent Publication No. 2009-61221 discloses an example of a health monitoring system.

SUMMARY

According to an embodiment of the present disclosure, a risk management system, which is an upper layer system connected to a plurality of lower layer systems is provided. The risk management system includes an acquisition unit, a normalization processing unit, and a prediction processing unit. The acquisition unit acquires first sensing data acquired by a first lower layer system capable of acquiring a first type of data, and a second sensing data acquired by a second lower layer system capable of acquiring a second type of data different from the first sensing data. The normalization processing unit generates first normalized data based on the first sensing data, performs a calculation process for performing normalization for generating second normalized data based on the second sensing data, and performs the calculation process for making the first normalized data and the second normalized data into coherent data to generate integrated normalized data. The prediction processing unit generates risk data to be predicted based on the integrated normalized data.

The risk management system may include a learning processing unit. The learning processing unit may generate an integrated normalized machine learning model by machine learning targeting the second integrated normalized data generated by the normalization processing unit using the first sensing data and the second sensing data acquired in advance. The prediction processing unit may apply the integrated normalized data to the integrated normalized machine learning model to generate the risk data.

In the risk management system, the normalization processing unit may set a first normalized reference point corresponding to the first sensing data and a second normalized reference point corresponding to the second sensing data based on a predetermined condition, apply the first sensing data and the first normalized reference point to a first normalization method for generating the first normalized data to generate the first normalized data, and apply the second sensing data and the second normalized reference point to a second normalization method for generating the second normalized data to generate the second normalized data.

In the risk management system, the first normalization method may be set based on first identification information associated with the first sensing data, and the second normalization method may be set based on second identification information associated with the second sensing data.

In the risk management system, the normalization processing unit may assign a weight value to at least one of the first normalized data, the second normalized data, and the integrated normalized data based on the predetermined condition, and the prediction processing unit may adjust the risk data based on the weight value.

In the risk management system, the acquisition unit may acquire at least one of user information and environment information, and the predetermined condition may be set based on at least one of the user information and the environment information.

The risk management system may include a warning information transmission unit configured to transmit warning information to a user terminal in accordance with the risk data.

According to an embodiment of the present disclosure, there is provided a risk management method including a risk management system, which is an upper layer system connected to a plurality of lower layer systems, which acquires first sensing data acquired by a first lower layer system capable of acquiring first type data and second sensing data acquired by a second lower layer system capable of acquiring second type data different from the first sensing data, generates first normalized data based on the first sensing data, generates second normalized data based on the second sensing data, performs calculation process for making the first normalized data and the second normalized data into coherent data to generate risk data based on the integrated normalized data.

The risk management method may further include generating an integrated normalized machine learning model by machine learning for the second integrated normalized data generated by performing the normalization process using the first sensing data and the second sensing data acquired in advance, and generating predicted risk data by generating the risk data by applying the integrated normalized data to the integrated normalized machine learning model.

In the risk management method, generating the first normalized data and the second normalized data may include setting a first normalized reference point corresponding to the first sensing data and a second normalized reference point corresponding to the second sensing data based on a predetermined condition, applying the first sensing data and the first normalized reference point to a first normalization method for generating the first normalized data to generate the first normalized data, and applying the second sensing data and the second normalized reference point to a second normalization method for generating the second normalized data.

In the risk management method, the first normalization method may be set based on first identification information associated with the first sensing data, and the second normalization method may be set based on second identification information associated with the second sensing data.

In the risk management method, generating the risk data includes assigning a weight value to at least one of the first normalized data, the second normalized data, and the integrated normalized data based on the predetermined condition, and adjusting the generated risk data based on the weight value.

In the risk management method, when acquiring the first sensing data and the second sensing data, at least one of user information and environment information may be acquired, and the predetermined condition may be set based on at least one of the user information and the environment information.

In the risk management method, warning information may be transmitted to a user terminal in accordance with the risk data.

By using an embodiment of the present disclosure, risk management can be performed easily and accurately using information acquired by a plurality of types of devices.

BRIEF DESCRIPTION OF DRAWINGS

FIG. 4 is an example of a data set including first sensing data and first normalized data.

FIG. 5 is an example of a data set including second sensing data and second normalized data.

FIG. 6 is an example of a data set including third sensing data and third normalized data.

FIG. 7 is an example of a data set including integrated normalized data.

FIG. 8 is an example of a data set including integrated normalized data and risk data.

FIG. 9 is a flowchart of a risk management method according to an embodiment of the present disclosure.

FIG. 11 is an example of a data set acquired in the risk management method.

FIG. 15A is an example of a data set obtained in the risk management method.

FIG. 15B is an example of a data set obtained in the risk management method.

FIG. 19 is a data table used in a normalization process.

DESCRIPTION OF EMBODIMENTS

Figure 1:
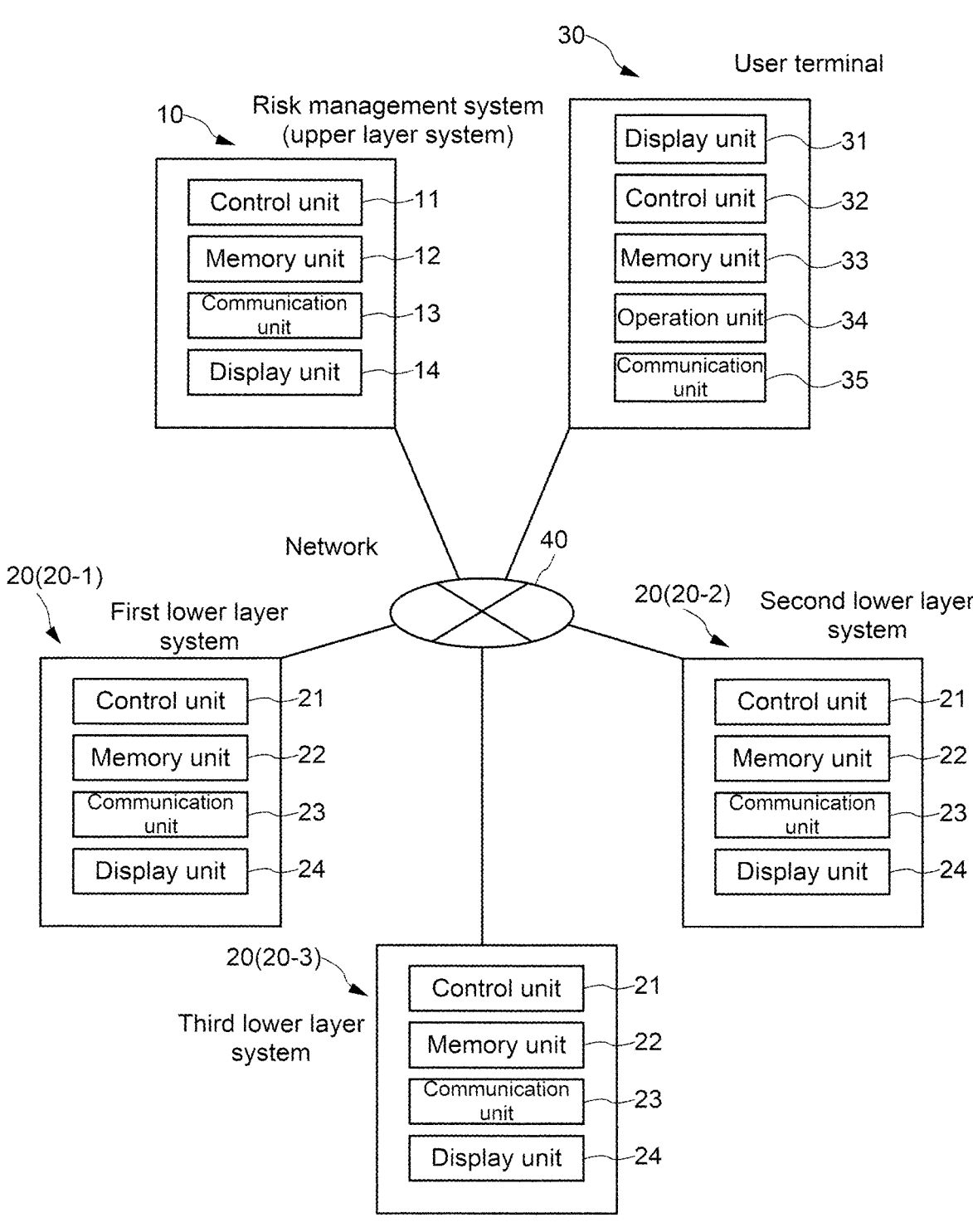
FIG. 1 is a diagram showing a configuration of hardware in a risk management coordination system according to an embodiment of the present disclosure.

Embodiments of the present disclosure will be described below with reference to the drawings and the like. However, the present disclosure can be implemented in many different modes, and should not be construed as being limited to the description of the following embodiments. Although the drawings may be represented schematically for the sake of clarity of illustration, they are only an example and are not intended to limit the interpretation of the disclosure.

Also, the letters "first" and "second" attached to each element are convenient signs used to distinguish each element, and have no further meaning unless otherwise stated. Note that in the drawings referred to in the present embodiment, the same portions or portions having similar functions are denoted by the same reference numerals or similar reference numerals (reference numerals A, B, 1, 2, and the like are only denoted by the numerals xxx), and a repetitive description thereof may be omitted. Part of the configuration may be omitted from the drawings. In addition, if the disclosure is recognizable to a person having ordinary skill in the field to which the disclosure pertains, no special explanation shall be given.

In the case of the system described in Japanese Laid Open Patent Publication No. 2009-61221, in the case of the conventional crisis monitoring system, a degree of danger is set based on information acquired by a specific device. Therefore, when different types of information are acquired by a plurality of devices consisting of different types, it was not possible to judge the risk by combining the information.

One object of the present disclosure is to perform risk management easily and accurately using information acquired by a plurality of types of devices.

First Embodiment

The risk management coordination system and the risk management method according to the first embodiment of the present disclosure will be described in detail with reference to the drawings.

(1-1. Hardware Configuration of Risk Management Coordination System)

FIG. 1 shows a hardware configuration of the risk management coordination system 1. Risk management processes for more precise risk management are implemented in some parts of the risk management coordination system 1. As shown in FIG. 1, the risk management coordination system 1 includes a risk management system 10 (also referred to as an upper layer system), a lower layer system 20 (also referred to as a sensing device), and a user terminal 30. The risk management system 10 functions as an application server acquiring sensing data input from a plurality of lower layer systems 20, storing the sensing data in a database for risk management, normalizing and integrating the acquired sensing data, and generating risk data. The risk management coordination system 1 is composed of a plurality of tiers of hierarchical systems, such as a lower layer system and an upper layer system.

The lower layer system 20 has a function of acquiring various types of sensing data. The lower layer system 20 includes a plurality of lower layer systems. In this example, a first lower layer system 20-1, a second lower layer system 20-2, and a third lower layer system 20-3 are provided. Specifically, the first lower layer system 20-1 has a function of acquiring heat index data. The second lower layer system 20-2 has a function of acquiring cumulative workload data. The third lower layer system 20-3 has a function of acquiring accumulated stay time data. When it is not necessary to separately explain each lower layer system, these systems will be described as the lower layer system 20.

The user terminal 30 is a terminal that inputs information related to sensing data to the risk management system 10 and the lower layer system 20, and transmits and receives various types of information. In FIG. 1, although one user terminal 30 is provided, a plurality of user terminals may be provided. The hardware configuration of the present embodiment is shown below.

The risk management system 10 includes a control unit 11, a memory unit 12, a communication unit 13, and a display unit 14. The control unit 11, the memory unit 12, the communication unit 13, and the display unit 14 are connected via a bus. In the present embodiment, a risk management server is used in the risk management system 10. The risk management system 10 may use an information processing device such as a PC (Personal Computer) or may be configured by a plurality of information processing devices.

The control unit 11 is one type of computer, and controls processing based on instructions defined in software (programs) for executing risk management processing using a CPU (Central Processing Unit), an ASIC (Application Specific Integrated Circuit), a FPGA (Field Programmable Gate Array), or other arithmetic processing circuits. Further, a user interface for executing the risk management program may be provided to the display unit 14 in response to a command from the control unit 11.

A semiconductor memory such as an SSD (Solid State Drive), a magnetic recording medium (magnetic tapes, magnetic disks, and the like), an optical recording medium, a magneto-optical recording medium, and other storable elements are used as the memory unit 12. The memory unit 12 stores a risk management program, and has a function as a risk management database 12a that stores sensing data, normalized data and the like used in the risk management program. The memory unit 12 may be provided in a server different from the risk management system 10 as appropriate, and may function as a database.

The communication unit 13 connects to the network 40 under the control of the control unit 11, and transmits and receives information to and from an external device. The communication unit 13 includes, for example, a modem or a NIC (Network Interface Card). Internet (specifically, SSL (Secure Sockets Layer)/TLS (Transport Layer Security) or VPN (Virtual Private Network)) or an intranet may be used for communication between the communication unit 13, and the lower layer system 20 and the user terminal 30.

The lower layer system 20 includes a control unit 21, a memory unit 22, a communication unit 23, and a display unit 24. The control unit 21, the memory unit 22, the communication unit 23, and the display unit 24 are connected via the bus. In the present embodiment, the lower layer system 20 may be configured by a single information processing device, or may be configured by a plurality of information processing devices.

The control unit 21 is one type of computer, and controls processing based on instructions defined in a program for acquiring sensing data and a program related to a risk management program by using the CPU, the ASIC, the FPGA, or other arithmetic processing circuits. The display unit 24 of the lower layer system 20 may provide a user interface for executing the above-described program in response to instructions from the control unit 21.

The semiconductor memory such as an SSD, the magnetic recording medium, the optical recording medium, the magneto-optical recording medium, or other storable element is used in the memory unit 22. The memory unit 22 stores a program related to the risk management program, and has a function as a database configured to store a program for acquiring sensing data and storing sensing data. The memory unit 22 may be provided in a server different from the lower layer system 20 as appropriate and may function as a database.

The communication unit 23 includes a transceiver, and performs communication of the risk management system 10, the user terminal 30, and other related information via the network 40. The communication unit 23 includes, for example, a modem or a NIC. The Internet (specifically, the SSL/TLS or the VPN) or an intranet may be used for communication between the communication unit 23, the risk management system 10, and the user terminal 30.

The user terminal 30 includes a display unit 31, a control unit 32, a memory unit 33, an operation unit 34, and a communication unit 35. The display unit 31, the control unit 32, the memory unit 33, the operation unit 34, and the communication unit 35 are connected via the bus. The user terminal 30 may be a smart phone, a mobile phone (feature phone), a tablet-type terminal, a notebook PC, a desktop PC, an IoT (Internet of Things) device (for example, a device having a power supply, a control function, a communication function, and a data storage function), or the like, and may be any device capable of communicating with the risk management system 10 via networks.

The display unit 31 is a display device such as a liquid crystal display or an organic EL (Electro Luminescence) display, and the display content is controlled by a signal input from the control unit 32.

The control unit 32 is one type of computer, and includes CPU, ASIC, FPGA, or other arithmetic processing circuits. The control unit 32 executes a program stored in the memory unit 33 such as a memory based on the operation of the display unit 31 and the operation unit 34. In addition, the control unit 32 transmits information for instructing execution of processing related to the risk management program stored in the memory unit 12 of the risk management system 10.

The operation unit 34 includes a controller, a button, or a switch. When a user performs an operation such as moving up, down, left, or right, pressing, or rotation by using the operation unit 34, information based on the operation is input to the control unit 32. Incidentally, as long as the display device has a touch sensor (touch panel), the display unit 31 and the operation unit 34 may be arranged at the same location.

The communication unit 35 has a function of transmitting and receiving data with the risk management system 10. For example, a transceiver through a LAN is used for the communication unit 35. The communication unit 35 is not limited to the transceiver via the LAN, and may be provided with a transceiver for mobile terminal communication (for example, LTE communication) or a transceiver for short-range wireless communication. The user terminal 30 is connected to the risk management system 10 via the network 40.

(1-2. Configuration of the Risk Management Control Unit 100)

Figure 2:
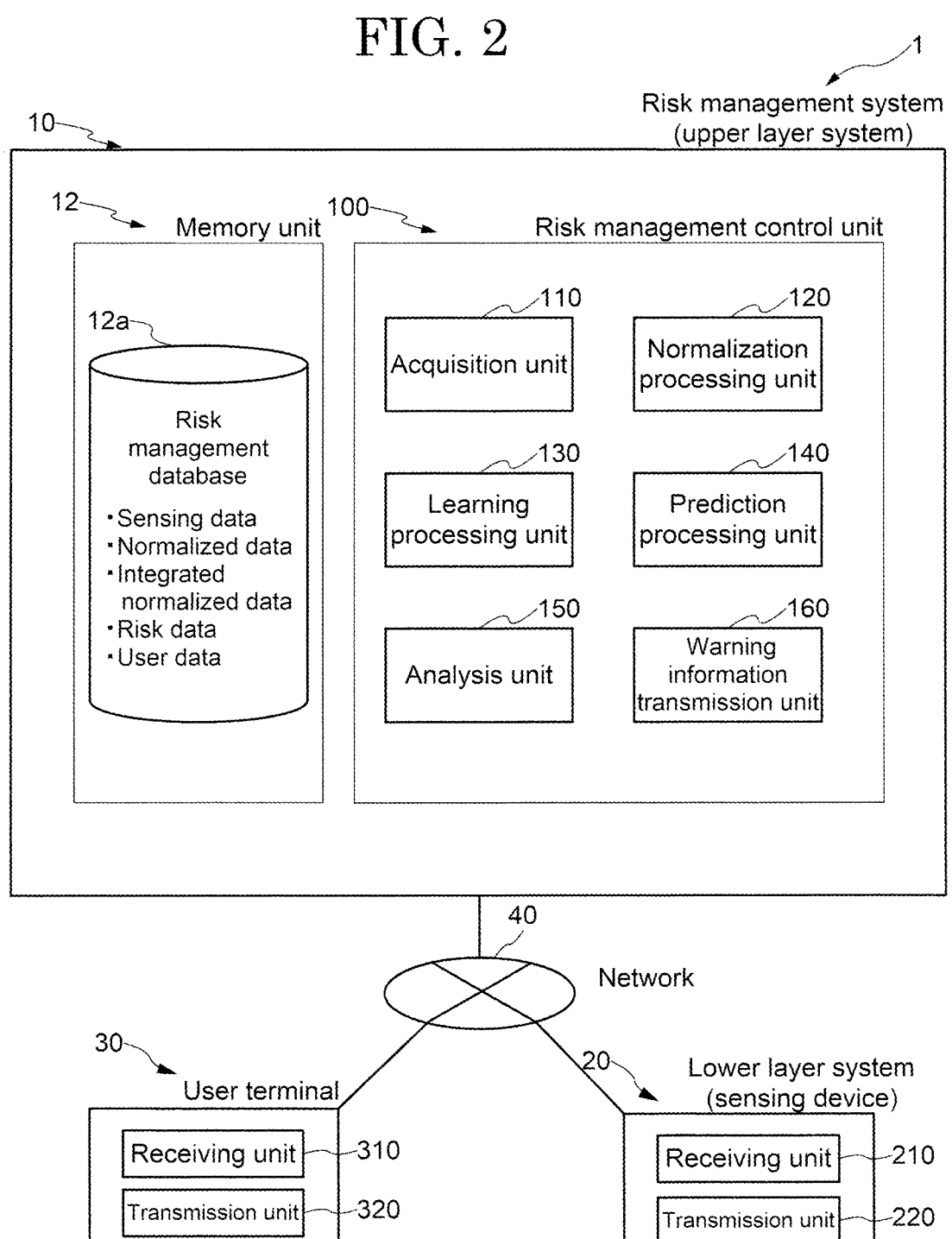
FIG. 2 is a functional block diagram of each component of a risk management coordination system according to an embodiment of the present disclosure.
Figure 3:
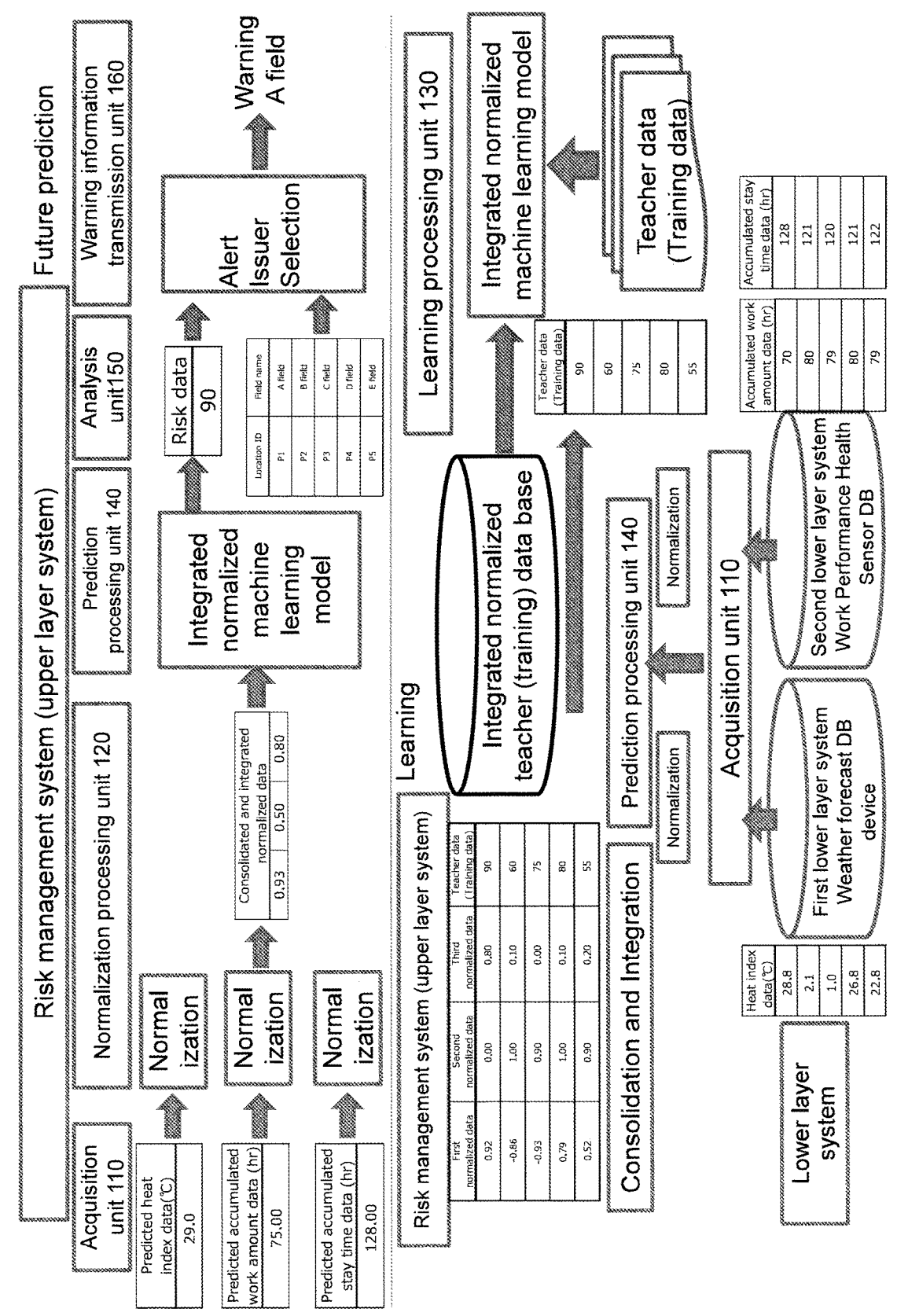
FIG. 3 is a schematic diagram showing a flow of data from a lower layer system to an upper layer system.

FIG. 2 is a functional block diagram composed of the components of the risk management coordination system 1. FIG. 3 is a schematic diagram showing the flow of data to the risk management system 10.

The risk management system 10 has a risk management control unit 100 that controls a program that realizes a risk management function (the risk management program). The risk management control unit 100 includes an acquisition unit 110, a normalization processing unit 120, a learning processing unit 130, a prediction processing unit 140, an analysis unit 150, and a warning information transmission unit 160.

The acquisition section 110 has a function of acquiring data (including normalized data) necessary to generate various types of sensing data and other risk data in the risk management coordination system 1. For example, the acquisition unit 110 may have a function of acquiring the first sensing data acquired or generated by the first lower layer system 20-1, the second sensing data acquired or generated by the second lower layer system 20-2, and the third sensing data acquired or generated by the third lower layer system 20-3.

The normalization processing unit 120 has a function of performing arithmetic processing for normalizing the acquired sensing data. "Normalization" in the present embodiment means setting a reference value for actual data (sensing data) acquired by the lower layer system 20, and generating relative data based on the reference value. By normalizing, the same decision index can be used for data of different data types or units. Thus, each sensing data can be determined in the same manner. Details of the normalization process will be described later.

FIG. 4 is an example of a first data set 510 of the first sensing data and data associated with the first sensing data. In this example, heat index data 510a and first normalized data 510b acquired in the first lower layer system are shown as the first data set 510.

FIG. 5 is an example of a second data set 520 of the second sensing data and data associated with the second sensing data. In this example, cumulative workload data 520a and second normalized data 520b acquired in the second lower layer system are shown as the second data set 520.

FIG. 6 is an example of a third data set 530 of the third sensing data and data associated with the third sensing data. In this example, cumulative residence time data 530a and third normalized data 530b acquired in the third lower layer system are shown as the third data set 530.

FIG. 7 is an example of a data set 540 of integrated normalized data. In this example, the data set 540 of the integrated normalized data is combined with the first normalized data 510b, the second normalized data 520b, and the third normalized data 530b in order.

FIG. 8 is an example of a data set 550 for configuring a model for machine learning. The data set 550 includes a consolidation of the first normalized data 510b, the second normalized data 520b, and the third normalized data 530b, as well as risk data 560 serving as teacher data (training data).

The learning processing unit 130 has a function of generating an integrated normalized machine learning model by machine learning targeting the second integrated normalized data generated by the normalization processing unit 120 using the first sensing data and the second sensing data acquired in advance.

The prediction processing unit 140 has a function of generating predicted risk data based on the integrated normalized data. In addition, the prediction processing unit 140 has a function of performing arithmetic processing for converting the normalized data generated by the normalization processing into one coherent data (integrated normalized data), and can generate risk data based on the integrated normalized data.

The analysis unit 150 has a function of comparing and analyzing the generated risk data with the risk data set in the predetermined condition to determine the presence or absence of the risk.

The warning information transmission unit 160 has a function of generating and transmitting warning information for notifying the presence of a risk to the user terminal 30 based on the risk data. The warning information may be display data such as character data or image data displayed on the display unit 31, or may be music data.

The lower layer system 20 executes the processing defined in the program related to the risk management processing program stored in the memory unit 22. The lower layer system 20 includes a receiving unit 210 and a transmission unit 220 as functional units. The receiving unit 210 has a function of receiving various data from the risk management system 10 and the user terminal 30. The transmission unit 220 has a function of transmitting various risk management information including sensing data to the risk management system 10.

The user terminal 30 executes the processing defined in the program related to the risk management processing program stored in the memory unit 33. The user terminal 30 includes a receiving unit 310 and a transmission unit 320 as functional units. The receiving unit 310 has a function of receiving the warning information based on the risk data from the risk management system 10. The transmission unit 320 has a function of transmitting a part of information related to the risk management program (for example, user information) to the risk management system 10 and the lower layer system 20.

(1-3. Risk Management Control Process)

Figure 9:
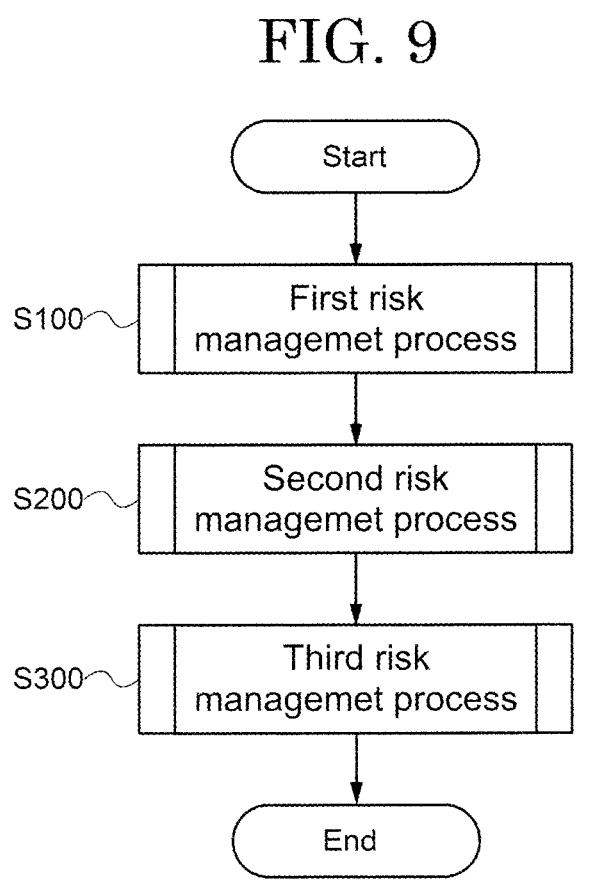

Next, a risk management control processing based on an instruction by the risk management program in the risk management control unit 100 is described. FIG. 9 is a flowchart of the risk management control process. As shown in FIG. 9, the risk management control process includes a first risk management control process S100, a second risk management control process S200, and a third risk management control process S300.

The first risk management control processing S100 includes a generating process and an acquiring process of the first sensing data (heat index data), the second sensing data (cumulative workload data), and the third sensing data (cumulative stay-time data). The second risk managing control process S200 includes a reference point setting process of the sensing data, a normalized data generation process from the sensing data, and a risk data generation process. The third risk management control process S300 includes a comparative-analysis process and a warning information generation process. The respective risk management control processes will be described separately.

(1-3-1. First Risk Management Control Process)

Figure 10:
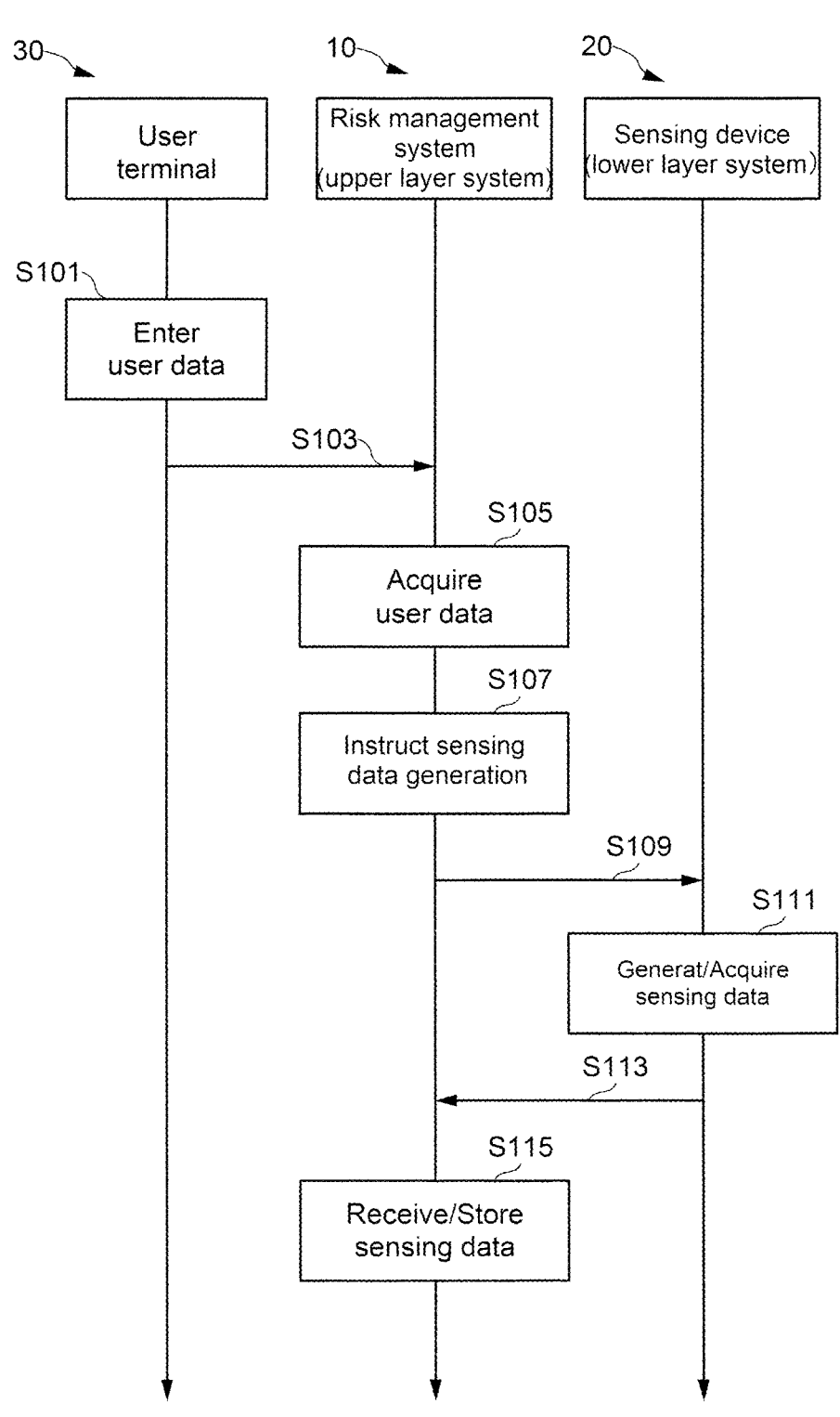
FIG. 10 is a flowchart of a risk management method according to an embodiment of the present disclosure.

FIG. 10 is a flowchart of the first risk management control process S100. As shown in FIG. 10, a user of the user terminal 30 first enters user data and environmental data into the user terminal 30 (S101). FIG. 11 is a data set 600 of user and environmental data which is input. In this example, user ID 610, user name 620, location ID 630, and field name 640 are entered as user data in the data set 600. The user terminal 30 transmits the input user data and environmental data to the risk management system 10 (S103), and the risk management system 10 receives and acquires the transmitted user data (S105).

The risk management system 10 generates and transmits the generation instruction information of the sensing data to the lower layer system 20 (S107, S109). Upon receiving the generation instruction information (S111), the lower layer system 20 generates or acquires sensing data based on the user information (S111). In this case, the sensing data may be a previously generated data stored in the memory unit 22 of the lower layer system 20, or may be generated and acquired newly based on sensing data generation instruction information. The lower layer system 20 may newly acquire the sensing data every time a certain period of time elapses.

In the present embodiment, the heat index (WBGT: Wet Bulb Globe Temperature) data is acquired as the first sensing data from the first lower layer system 20-1. The heat index is an index related to heat transfer (heat balance) between the human body and the outside air. The heat index is generated based on a factor having a large influence on the heat balance of the human body. The following factors are used: (1) humidity, (2) thermal environment such as solar radiation, and (3) air temperature. The heat index data may be used in combination with geographic information. Note that a weather forecast DB (database) device is used for the first lower layer system 20-1 in the present embodiment.

The second lower layer system 20-2 generates and acquires cumulative work amount data as the second sensing data. The weather forecast DB device is used for the second lower layer system 20-2 in this case. Hours exceeding the basic working hours per month (overtime) is used as the cumulative workload data. A work performance health sensor DB device may be used as the second lower layer system 20-2.

The third lower layer system 20-3 generates cumulative stay time data as the third sensing data. The total time calculated by subtracting the time of arrival from the time of leaving on the day of arrival for one month is used as the cumulative stay time spent per month data. The work performance health sensor DB device may be used as the third lower layer system 20-3.

As shown in FIG. 3, the lower layer system 20 transmits the acquired sensing data to the risk management system 10 (S113). Upon receiving the sensing data (S115), the risk management system 10 stores the received sensing data in the risk management database 12a provided in the memory unit 12 (S115). Thus, the first risk management control process S100 ends.

(1-3-2. Second Risk Management Control Process)

Figure 12:
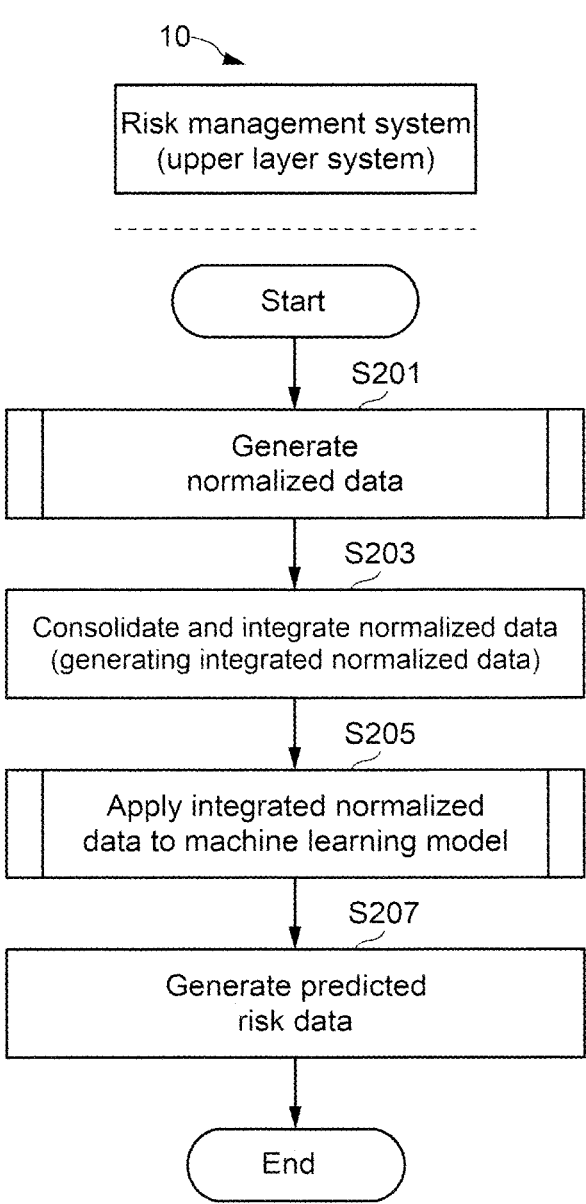
FIG. 12 is a flowchart of a risk management method according to an embodiment of the present disclosure.

FIG. 12 is a flowchart of the second risk management control process S200. The second risk management control process S200 is executed following the first risk management control process S100. First, the risk management system 10 generates normalized data based on the acquired sensing data (S201). The generation of the normalized data will be described in detail below.

Figure 13:
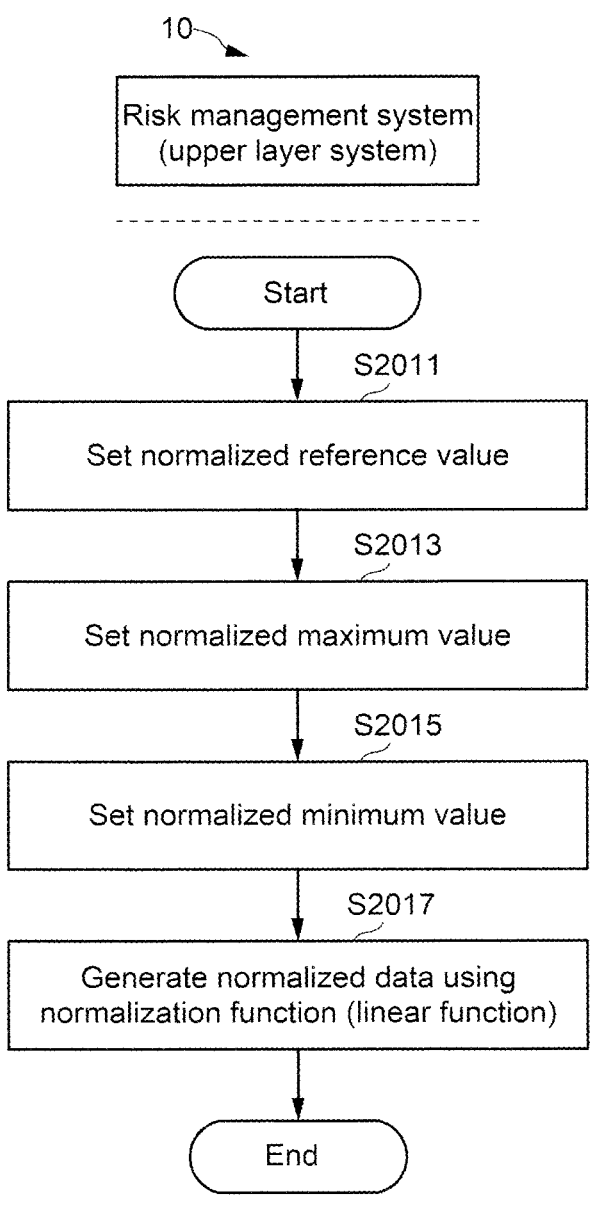
FIG. 13 is a flowchart of a risk management method according to an embodiment of the present disclosure.

FIG. 13 is a flowchart of a S201 for generating normalized data. First, a normalized reference value (S2011), a normalized maximum value (S2013), and a normalized minimum value (S2015) associated with the respective sensing data are set. The normalized reference value, the normalized maximum value, and the normalized minimum value can be arbitrarily set.

In the case of the heat index data which is the first sensing data, the heat index data "15° C." is set as the normalized reference value "0" in this example. Similarly, the heat index data "30° C." is set as the normalized maximum value "1". Similarly, the heat index data "0° C." is set as the normalized minimum value "−1".

When the above setting is performed, the sensing data is subjected to a normalization process based on a predetermined mathematical expression (normalization function) (S2017). In this example, the normalization process is performed based on the following equation 1 (linear function). When identification information is set in each sensing data, the risk management system 10 may set a normalization method based on the information and perform arithmetic processing.

$$\text{Nomalvalue} = t - (t-s)*(\text{max} - \text{Value})/(\text{max} - \text{min}) \qquad \text{[Equation 1]}$$

In Equation 1, "Nomalvalue" indicates normalized data. "Value" indicates sensing data. "Max" indicates the maximum value of sensing data. "Min" indicates the minimum value of sensing data. "t" indicates the normalized maximum. "s" indicates the normalized minimum. In this example, in Equation 1, the sensing data and the normalized data have a linear relationship.

When the sensing data and the normalized reference value are applied to Equation 1 to perform the arithmetic processing, the first normalized data is uniquely generated corresponding to each of the heat index data as shown in FIG. 4.

The second sensing data is also subjected to the normalization process in the same manner as the first sensing data. In the case of the cumulative work amount data as the second sensing data, the cumulative work amount data "70 hours" is set as the normalized reference value "0". Similarly, the accumulated work amount data "80 hours" is set as the normalized maximum value "1". Similarly, the accumulated work amount data "60 hours" is set as the normalized minimum value "−1".

When the above setting is performed, the normalization process is performed based on Equation 1. In this case, as shown in FIG. 5, the second normalized data is uniquely generated corresponding to each cumulative work amount data.

The third sensing data is also subjected to normalization process in the same manner as the first sensing data. In the case of the cumulative stay time data which is the third sensing data, the cumulative stay time data "120 hours" per month is set as the normalized reference value "0". Similarly, the cumulative stay time data "130 hours" per month is set as the normalized maximum value "1". Similarly, the accumulated stay time data "110 hours" is set as the normalized minimum value "−1".

When the above setting is performed, the normalization process is performed based on Equation 1. In this case, as shown in FIG. 6, the third normalized data is uniquely generated corresponding to each of the accumulated stay time data.

Next, the generated normalized data is consolidated and integrated (S203). In the present embodiment, as shown in FIG. 3 and FIG. 7, the first normalized data, the second normalized data, and the third normalized data are consolidated and integrated in this order.

Next, the risk management system 10 applies the integrated normalized data to the machine learning model using the consolidated and integrated normalized data (S205), and generates predicted risk data (S207). In this example, the risk management system 10 generates risk data as output data. In this example, the risk data is set with "0" as the minimum value and "100" as the maximum value. Symbols such as C1, C2 . . . , Cn may be used for the risk data.

Figure 14:
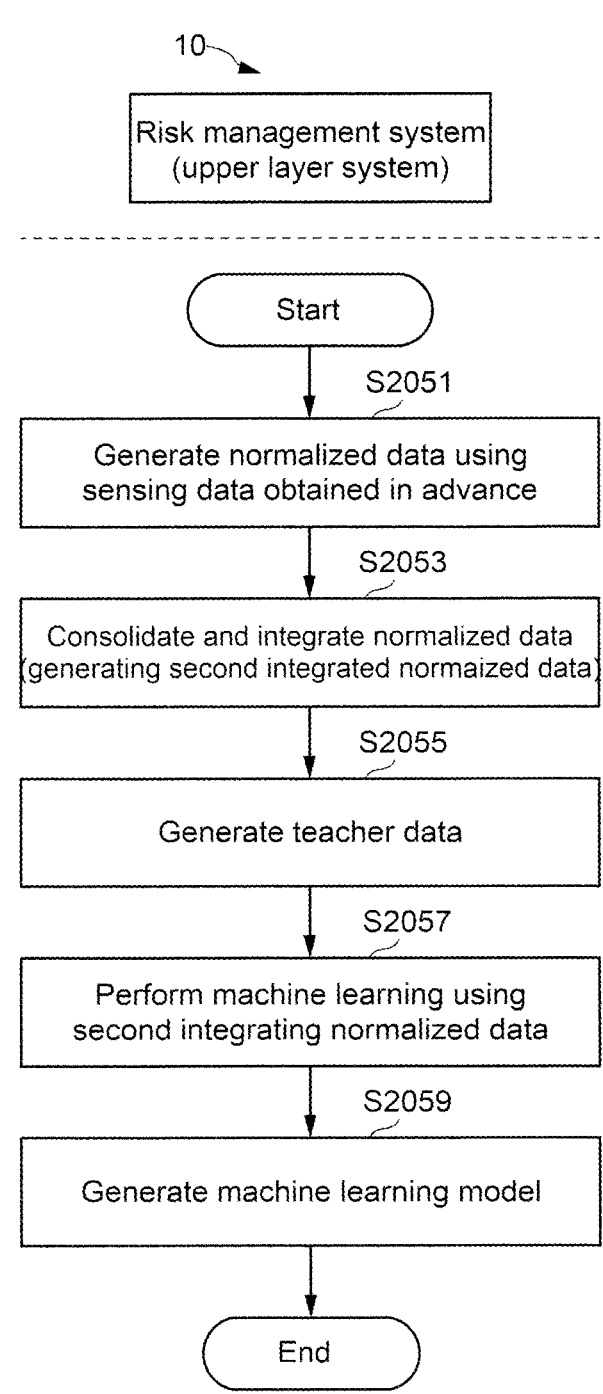
FIG. 14 is a flowchart of a risk management method according to an embodiment of the present disclosure.

The machine learning model used in the present embodiment will be described in detail below. FIG. 14 is a flowchart showing a method S205 to generate machine learning models. As shown in FIG. 14, the normalization processing unit 120 in the risk management system 10 generates normalized data using the sensing data acquired in advance in the risk management database 12a of the memory unit 12 (S2051). The sensing data acquired in advance in this case may be, for example, data for one week. Next, the normalization processing unit 120 generates normalized data (also referred to as second integrated normalized data) that is consolidated and integrated using the above-described normalized data (S2053). Next, the learning processing unit 130 generates risk data serving as teacher data (training data) in accordance with the second integrated normalized data (S2055), and stores the risk data in the database. FIG. 8 is an example of a data set 550 for configuring a model for machine learning. The data set 550 includes integrated the first normalized data 510b, the second normalized data 520b, and the third normalized data 530b, as well as the risk data 560 serving as the teacher data (training data). The teacher data (training data) may be preset by inputting information from the user. The learning processor 130 performs machine learning (S2057) using algorithms of Artificial Intelligence (AI) with respect to the integrated normalized data (and the teacher data (training data)), and forms the machine learning models (S2059).

FIG. 15A is an example of each sensing data used as prediction data and a data set of normalized data corresponding to each sensing data. FIG. 15B is an example of a data set of integrated normalized data and risk data generated from integrated normalized data. In this example, as each sensing data, the predicted heat index data "29° C.", the predicted accumulated work amount data "75 hr", and the predicted accumulated stay time data "128 hr" are acquired. In this case, the first normalized data "0.93" is generated from the predicted heat index data "29° C.". Similarly, the second normalized data "0.50" is generated from the predicted accumulated work amount data "75 hr". Furthermore, the third normalized data "0.80" is generated from the predicted accumulated stay time data "128 hr". Next, integrated normalized data (0.93, 0.50, 0.80) obtained by consolidating and integrating the first normalized data, the second normalized data, and the third normalized data are input as input data for machine learning. As a result, "90" is output as risk data. Thus, the second risk management control process S200 ends.

(1-3-3. No. 3 Risk Management Control Process)

Figure 16:
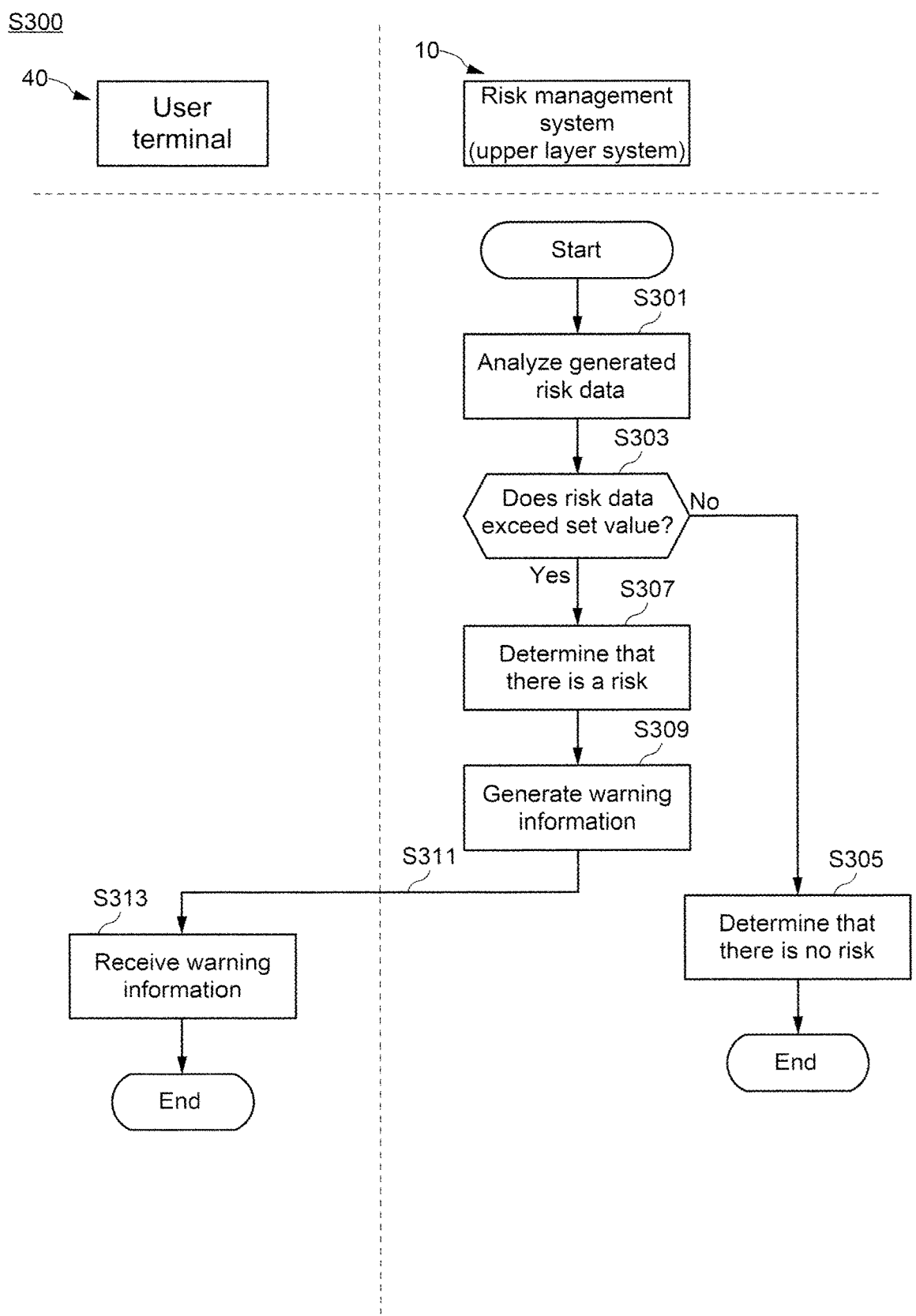
FIG. 16 is a flowchart of a risk management method according to an embodiment of the present disclosure.

FIG. 16 is a flowchart of the third risk management control process S300. The third risk management control process S300 is executed following the second risk management control process S200. First, the risk management system analyzes the generated risk data (S301). In this case, the risk management system 10 determines whether or not the risk data exceeds a set value (S303). The set value is arbitrarily set. In this example, the risk management system 10 determines whether the risk data exceeds "80".

When the risk data does not exceed the set value (S303; No), the risk management system 10 determines that there is no risk (S305). On the other hand, when the risk data exceeds the set value (S303; Yes), the risk management system 10 determines that the risk data is present (S307). In this case, the risk management system 10 generates warning information (S309). In addition, the risk management system 10 selects a warning issuance destination to which warning information is to be transmitted. The warning information includes risk data as well as information to inform of a risk for future work. The risk management system 10 transmits the warning information to the user terminal 30 (S311), and the user terminal 30 receives the warning information (S313). In this example, the risk management system 10 transmits the warning information to a user terminal 30 of a user at the A site. When the user terminal 30 receives the warning information, the user can know the risk of the operation at present or in the future.

By using this embodiment, since information acquired by various lower layer systems is converted into normalized data, various data can be evaluated on the same basis. Further, normalized data can be consolidated and integrated to determine a single piece of data. Thus, it is possible to facilitate comprehensive risk judgment. Therefore, by using the present embodiment, it is possible to performed risk management easily and accurately using information acquired by a plurality of types of devices.

In addition, the risk management system of the present embodiment learns risk information using multiple types of data acquired in the lower layer system, and it is also possible to make future forecasts based on the risk information.

Second Embodiment

In the present embodiment, a risk management control process different from that of the first embodiment will be described. Specifically, an example of generating normalized data using a nonlinear function will be described.

Figure 17:
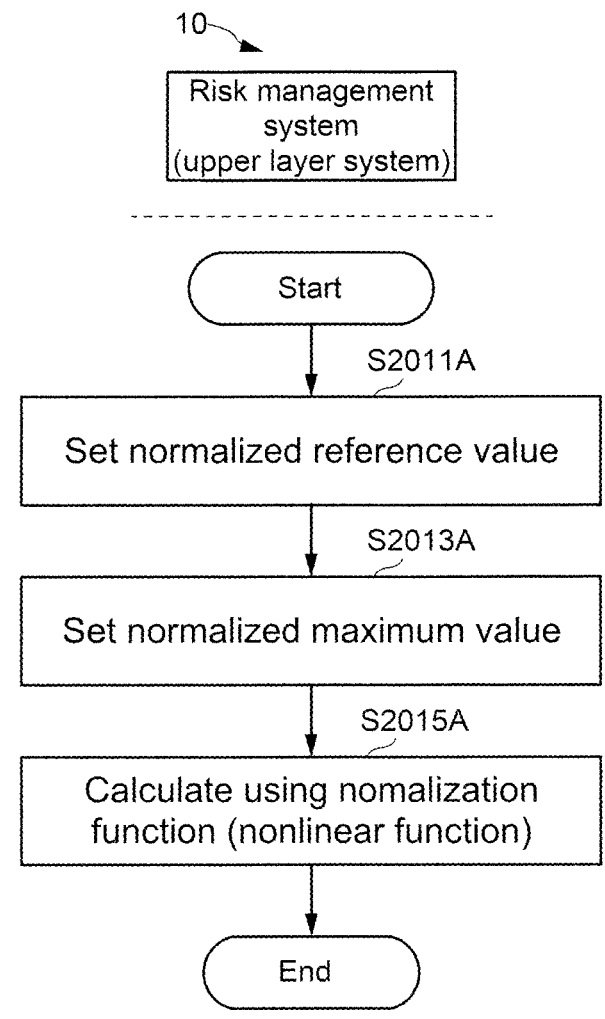
FIG. 17 is a flowchart of a risk management method according to an embodiment of the present disclosure.

FIG. 17 is a flowchart of the normalization process S201A according to the present embodiment. First, a normalized reference value (S2011A) and a normalized maximum value (S2013A) are set associated with each sensing data. In this example, the normalized reference value and the normalized minimum value may be the same. The normalized reference value and the normalized maximum value can be arbitrarily set.

The normalization functions are then used to generate the normalized data (S2015A). In the present embodiment, a nonlinear function is used as the normalization function. Specifically, as the nonlinear function, a quadratic function may be used as in Equation 2, or an exponential function may be used as in Equation 3.

$$\text{Nomalvalue}=a*\text{Value}^2+b*\text{Value}+c \qquad \text{[Equation 2]}$$

$$\text{Nomalvalue}=c*a^{Value}+b \qquad \text{[Equation 3]}$$

"Nomalvalue" indicates normalized data. "Value" indicates sensing data. In Equations 2 and 3, a, b, and c may be arbitrarily set.

By the above, for the acquired sensing data, the normalized data can be generated using a nonlinear function. That is, by using the present embodiment, even when the sensing data and the normalized data have a nonlinear relationship, it is possible to generate appropriate normalized data.

Third Embodiment

In the present embodiment, risk management control processing different from the risk management control process of the first embodiment will be described. Specifically, an example of generating the normalized data based on the data table will be described.

Figure 18:
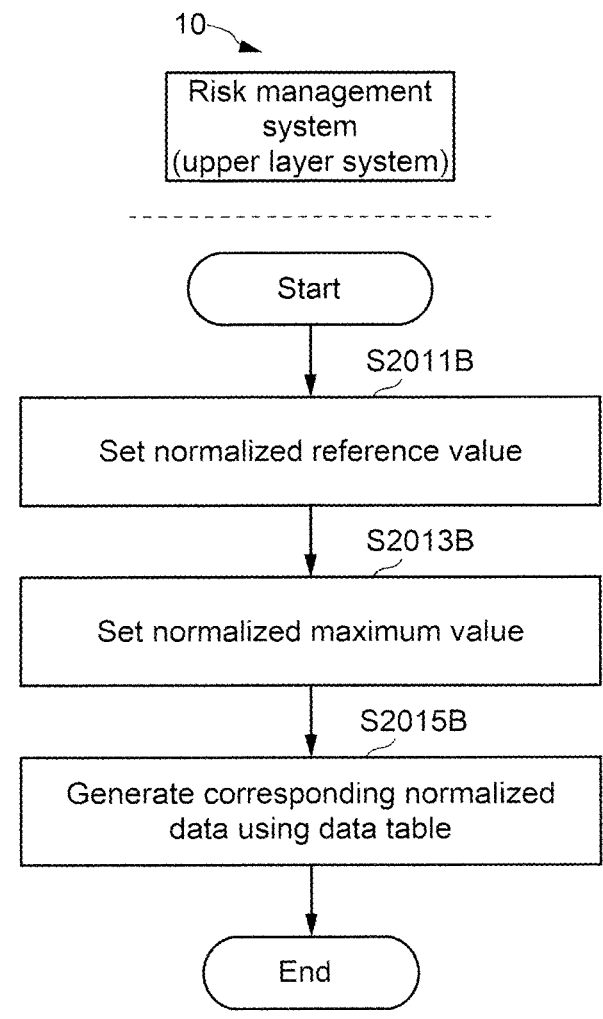
FIG. 18 is a flowchart of a risk management method according to an embodiment of the present disclosure.

FIG. 18 is a flowchart of the normalized data generating process (S201B). FIG. 19 is a data table 700 showing the relationship between the heat index data and the normalized data. The data table 700 includes heat index data 710, warning level data 720, and normalized data 730. In this example, independent warning level data is set for the heat index data. As shown in FIG. 19, the heat index data is set in a range of 0° C. or more and 39° C. or less.

As shown in FIG. 18, first, the normalized reference value is set (S2011B). In this example, when the heat index data is "0° C.", the warning level data and the normalized data are "0". In the present embodiment, the normalized reference value and the normalized minimum value may be set to be the same.

Then, the normalized maximum value is set (S2013B). In this example, when the heat index data is "39° C.", the maximum value of the warning level data is "5". In this case, the normalized maximum value is "1". The normalized data is set as one-fifth of the warning level data.

Normalized data in the heat index range of 1° C. to 38° C. are generated as follows. When the heat index is 24° C. or less, the warning level data is set as 0 because the influence on the human body is small. Therefore, the corresponding normalized data is also 0.

The warning level data increases from 0.1 to 0.5 in 0.1 increments in the heat index range between 25° C. and 29° C. In this case, the normalized data is set from 0.02 to 0.1 in increments of 0.02. In the range of the heat index of 30° C. or more and 38° C. or less, it is set so that the increment of the warning level data becomes large because the influence on the human body is large. In response to this, the increment of the normalized data is also set to be large.

In the present embodiment, the normalized data can be easily generated by referring to the data table with respect to the input heat index data. Thus, even when the sensing data and the normalized data do not have a linear relationship, appropriate normalized data can be generated by referring to the data table.

In the present embodiment, the normalized data is generated via an intermediate value called warning level data. The risk information that the user has already acquired can also be used as an indicator of the risk judgment by using the warning level data. Therefore, it is possible to clarify the meaning of the numerical values in the normalized data.

Fourth Embodiment

In the present embodiment, a risk management control process different from that of the first embodiment will be described. Specifically, an example in which weighting is performed on the normalized data will be described. It is noted that descriptions of portions overlapping with those of the first embodiment of the present disclosure will be omitted as appropriate.

Figure 20:
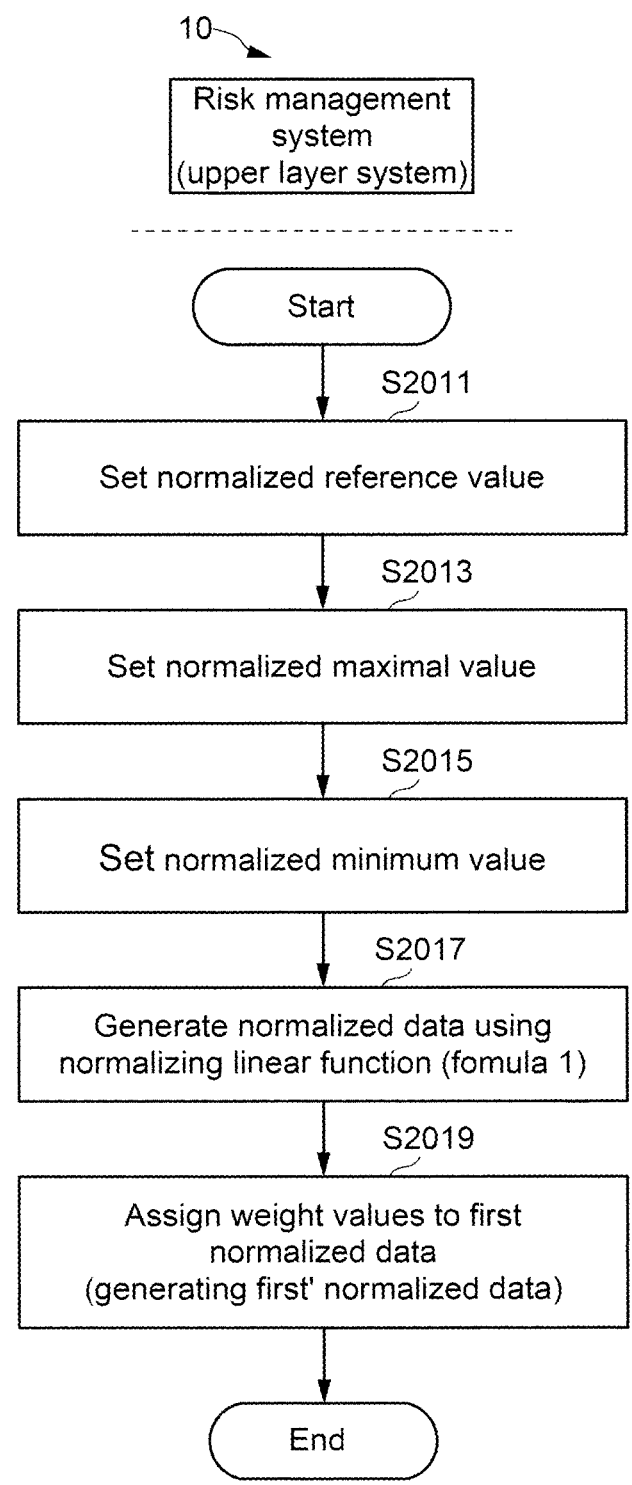
FIG. 20 is a flow diagram of a risk management method according to an embodiment of the present disclosure.

FIG. 20 is a flowchart of the normalized data generating process S201C. In the present embodiment, after the normalized data is generated (S2017), weight values may be assigned to the normalized data (S2019). In this example, a weight value is assigned to the first normalized data generated from the heat index data. When the weight value is assigned, the risk data may be adjusted based on the first normalized data to which the weight value is assigned. Thus, the importance of the first normalized data can be increased compared with the second normalized data generated from the cumulative workload data and the third normalized data generated from the cumulative stay time data. As a result, the risk management in the risk management system can be improved.

In the present embodiment, although a weight value is given after generating normalized data, the present disclosure is not limited thereto. For example, weighting may be performed after integration (to integrated normalized data).

Fifth Embodiment

In the present embodiment, a risk management control process different from that of the first embodiment will be described. Specifically, an example of changing the set value when the user terminal receives the warning information in the third risk management control process will be described. It is noted that descriptions of portions overlapping with the first embodiment of the present disclosure will be omitted as appropriate.

Figure 21:
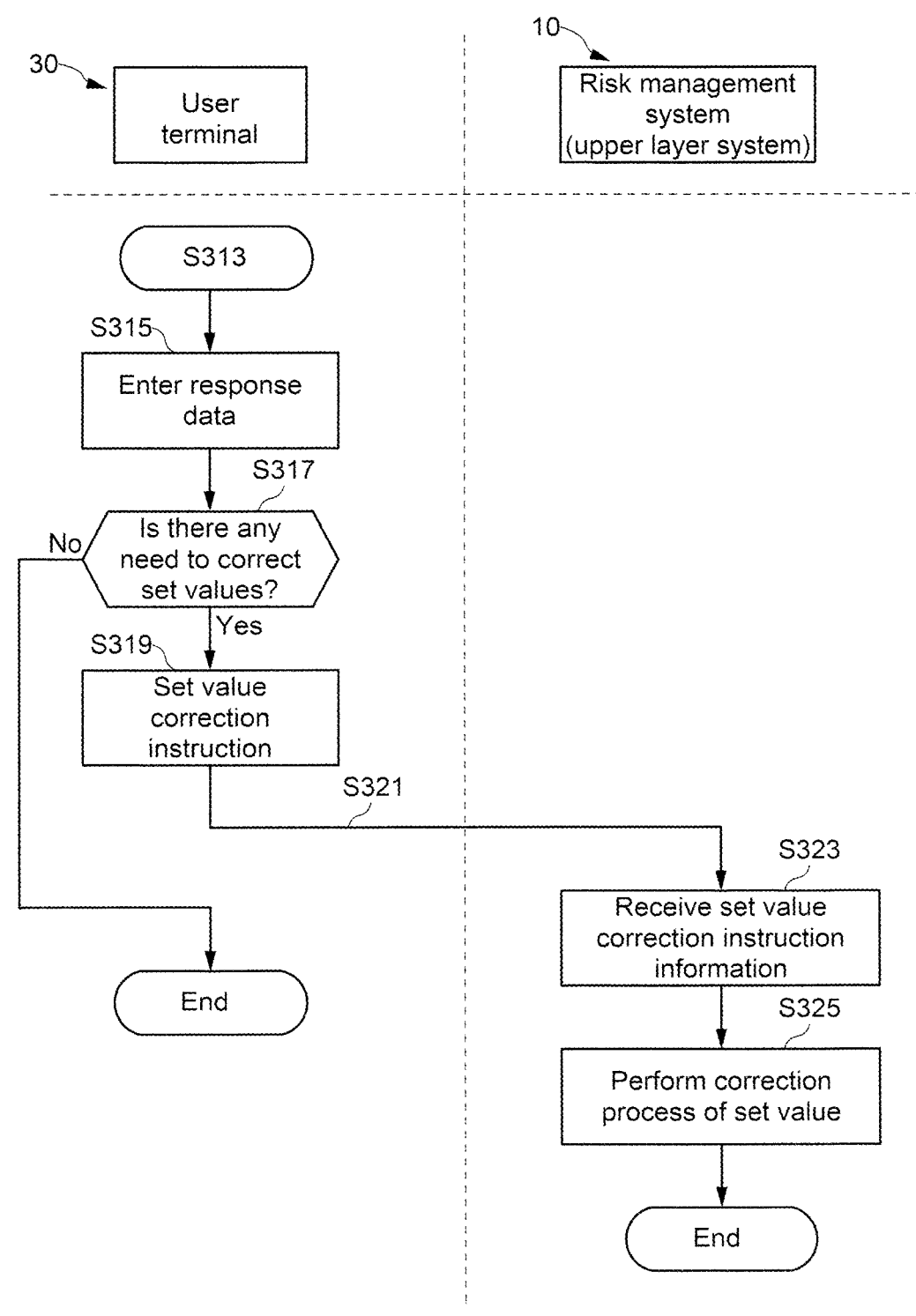
FIG. 21 is a flowchart of a risk management method according to an embodiment of the present disclosure.

FIG. 21 is a flowchart of the third risk management control process S300D. When the user terminal 30 receives the warning information (S313), if the user determines that there is no risk in the present situation, the user can input the response data to the user terminal 30. For example, when the warning information is displayed on the display unit 31 of the user terminal 30, the question sentence "Is this warning information appropriate for you?" and push buttons for answering "Yes" and "No" may be displayed together. In this case, when the user presses the push button for the response, the response data is input (S315). In this case, the user terminal 30 determines whether or not it is necessary to correct the setting value for determining whether to generate the warning information. When the user presses "No", it is determined that there is no need to correct the set values (S317; No), and the third control process S300D ends.

When the user presses "Yes", the user terminal 30 determines that the setting value needs to be corrected (S317; Yes), generates set value correction instruction information, and transmits the information to the risk management system 10 (S319, S321).

The risk management system 10 receives the set value correction instruction information (S323), performs a correction process of the set value (S325). Thus, the third risk management control process S300D ends. After the set value is corrected, risk data analysis processing may be performed again.

In the present embodiment, even if it is determined that there is a risk and the warning information is transmitted, feedback can be performed in accordance with the actual risk. As a result, risk management can be performed more accurately.

Modifications

Within the scope of the present disclosure, a person skilled in the art can conceive of various changes and modifications, which are also understood to be within the scope of the present disclosure. For example, as long as the gist of the present disclosure is provided, any addition, deletion, or design change of the design of components or any addition, omission, or change of the conditions of processes by a person skilled in the art, as appropriate, is included in the scope of the disclosure.

In the first embodiment of the present disclosure, although an example has been described in which the first lower layer system 20-1, the second lower layer system 20-2, and the third lower layer system 20-3 are provided as the lower layer system 20, the present disclosure is not limited thereto. A plurality of sensing data may be generated from one lower layer system.

In addition, in the first embodiment of the present disclosure, although an example has been described in which three sensing data are used, the present disclosure is not limited thereto. For example, two sensing data may be used, or four or more data may be used. That is, in the present disclosure, at least two or more sensing data (the first sensing data and the second sensing data) may be used.

In addition, in the first embodiment of the present disclosure, when setting the normalized reference value, the normalized reference value may be set based on the user information such as age, sex, length of service, and environment information (or geographic information) of the user. In the case of generating the normalized data using the linear function, a predetermined coefficient or constant may be appropriately set. This allows the normalized data to be adjusted for each user. Therefore, for the sensing data which is determined to have a high risk according to each person, the risk management according to the user can be performed, such as setting the normalized data to be high.

In addition, in the first embodiment of the present disclosure, although an example in which the warning information is generated when the risk data satisfies a predetermined condition has been described, the present disclosure is not limited thereto. For example, the warning information may be generated when the normalized data generated from each sensing data is out of the range from the normalized minimum value "−1" to the normalized maximum value "1" and is different from the normal one. As a result, the warning information can be generated more quickly, and higher risk management can be performed.

In the first embodiment of the present disclosure, as shown in FIG. 4 to FIG. 7, although an example is shown in which numerical data is used for the first normalized data, the second normalized data, and the third normalized data, the present disclosure is not limited thereto. For example, other than numerical data, the alphabet or the like may be used for these settings. Specifically, when the first normalized data is "A", the second normalized data is "A", and the third normalized data is "B", the integrated normalized data is "AAB". In this case, risk data may be generated according to the number of "A". When the number of "A" is large, the risk data is determined to be "high" and the warning information may be transmitted.

In the first embodiment of the present disclosure, although an example is shown in which the first normalized data, the second normalized data, and the third normalized data are integrated in the order, the present disclosure is not limited thereto. For example, the order of integration may be set according to the priority of the normalized data.

In the first embodiment of the present disclosure, although an example in which the heat index data, the cumulative work amount data, and the cumulative stay time data are used as the sensing data has been described, the present disclosure is not limited thereto. For example, body temperature data, hydration amount data, pulse data, heart rate data, respiration data, body inclination data, time data, age data, female data, and the like of the worker may be used. The risk management system 10 can expand the machine learning model and generate risk data with higher accuracy by acquiring many types of sensing data from a larger number of lower layer systems. Therefore, high-precision risk management can be performed.

In the first embodiment of the present disclosure, although the first normalized data, the second normalized data, and the third normalized data are consolidated and integrated to generate the integrated normalized data, the present disclosure is not limited thereto. For example, the integrated normalized data may be generated by performing predetermined arithmetic processing such as addition or multiplication of the first normalized data, the second normalized data, and the third normalized data.

In the first embodiment of the present disclosure, although an example has been described in which teacher data (training data) is generated using sensing data acquired in advance for one week in order to generate the machine learning model, the present disclosure is not limited thereto. For example, the sensing data acquired in advance may be one year.

Further, new teacher data (training data) may be generated every time a predetermined period of time (for example, one week) elapses. As a result, the machine learning model is updated, and more accurate risk data can be generated. Therefore, it is possible to improve the accuracy of the risk management.

What is claimed is:

1. A risk management system for improving prediction accuracy of labor-related risk assessment through adaptive machine learning, the risk management system being an upper layer system connected to a plurality of lower layer systems, the risk management system comprising:

a first processor; and a first memory device configured to store a program executed by the first processor to cause the first processor to:

acquire, from a first lower layer system comprising a first sensor type connected to a second processor and a second memory device, first sensing data comprising heat index measurements;

acquire, from a second lower layer system comprising a second sensor type, different from the first sensor type, and connected to a third processor and a third memory device, second sensing data comprising workload measurements;

train a machine learning model to predict risk data using historical first sensing data, historical second sensing data, and historical risk data serving as teacher data, the historical data being acquired in advance;

acquire user-specific information related to a human worker, the user-specific information including two or more of a length of service, environment information, age, and sex;

generate user-adapted first normalized data by:

determining a first normalized reference value based on the acquired user-specific information; and applying a first normalization arithmetic formula that transforms the first sensing data relative to the first normalized reference value, wherein the transformation adjusts the heat index measurements in the acquired first sensing data to account for individual worker characteristics;

generate user-adapted second normalized data by:

determining a second normalized reference value based on the acquired user-specific information; and applying a second normalization arithmetic formula that transforms the second sensing data relative to the second normalized reference value, wherein the transformation adjusts the workload measurements in the acquired second sensing data to account for the individual worker characteristics;

synthesize the user-adapted first normalized data and the user-adapted second normalized data into integrated normalized data through an arithmetic process that generates one coherent data for input into the machine learning model;

generate improved predicted risk data by inputting the integrated normalized data into the trained machine learning model, wherein the predicted risk data exhibits increased accuracy through the user-specific normalization that adapts the machine learning model inputs to individual worker characteristics; and periodically retrain the trained machine learning model after an elapsed period of time using updated user-specific information, newly acquired first sensing data, newly acquired second sensing data, and actual risk outcomes from the elapsed period of time as new teacher data, wherein the machine learning model generates the predicted risk data by assigning a weight value to at least one of the first normalized data, the second normalized data and the integrated normalized data based on a predetermined condition, and wherein the predicted risk data is adjusted based on the weight value.

2. The risk management system according to claim 1, wherein the first normalization method is set based on first identification information associated with the first sensing data; and the second normalization method is set based on second identification information associated with the second sensing data.

3. The risk management system according to claim 1, wherein the predetermined condition is set based on the user information.

4. The risk management system according to claim 1, wherein the program causes the first processor to:

transmit warning information to a user terminal in accordance with the predicted risk data.

5. The risk management system according to claim 1, wherein the user-adapted first normalized data is generated such that:

in a range equal to or less than a first threshold value, warning level data and the normalized data are set to a minimum value indicating negligible risk, in a range greater than the first threshold value and equal to or less than a second threshold value, the warning level data and the normalized data are set to increase by a first increment rate, respectively, and in a range greater than the second threshold value and equal to or less than a third threshold value, the warning level data and the normalized data are set to increase at a second increment rate greater than the first increment rate, thereby providing nonlinear risk assessment that reflects increasing danger at higher heat indices.

6. The risk management system according to claim 1, wherein the first processor further executes the program to generate warning information for notifying a risk for future work based on the improved predicted risk data, wherein the improved predicted risk data accounts for both environmental conditions including heat index factors and user-specific information to enable risk management according to each user.

7. A risk management method for improving prediction accuracy of labor-related risk assessment through adaptive machine learning, the risk management method comprising:

acquiring, from a first lower layer system comprising a first sensor type, first sensing data comprising heat index measurements;

acquiring, from a second lower layer system comprising a second sensor type, different from the first sensor type, second sensing data comprising workload measurements;

training a machine learning model to predict risk data using historical first sensing data, historical second sensing data, and historical risk data serving as teacher data, the historical data being acquired in advance;

acquiring user-specific information related to a human worker, the user-specific information including two or more of a length of service, environment information, age, and sex;

generating user-adapted first normalized data by:

determining a first normalized reference value based on the acquired user-specific information; and applying a first normalization arithmetic formula that transforms the first sensing data relative to the first normalized reference value, wherein the transformation adjusts the heat index measurements in the acquired first sensing data to account for individual worker characteristics;

generating user-adapted second normalized data by:

determining a second normalized reference value based on the acquired user-specific information; and applying a second normalization arithmetic formula that transforms the second sensing data relative to the second normalized reference value, wherein the transformation adjusts the workload measurements in the acquired second sensing data to account for the individual worker characteristics;

synthesizing the user-adapted first normalized data and the user-adapted second normalized data into integrated normalized data through an arithmetic process that generates one coherent data for input into the machine learning model;

generating improved predicted risk data by inputting the integrated normalized data into the trained machine learning model, wherein the predicted risk data exhibits increased accuracy through the user-specific normalization that adapts the machine learning model inputs to individual worker characteristics; and periodically retraining the trained machine learning model after an elapsed period of time using updated user-specific information, newly acquired first sensing data, newly acquired second sensing data, and actual risk outcomes from the elapsed period of time as new teacher data, wherein the machine learning model generates the predicted risk data by assigning a weight value to at least one of the first normalized data, the second normalized data and the integrated normalized data based on a predetermined condition, and wherein the predicted risk data is adjusted based on the weight value.

8. The risk management method according to claim 7, wherein the first normalization method is set based on first identification information associated with the first sensing data; and the second normalization method is set based on second identification information associated with the second sensing data.

9. The risk management method according to claim 7, wherein the predetermined condition is set based on the user information.

10. The risk management method according to claim 7 further comprising:

transmitting warning information to a user terminal in accordance with the predicted risk data.

* * * * *